United States Patent [19]
Cerbo

[11] 3,877,918
[45] Apr. 15, 1975

[54] APPARATUS FOR PRODUCING SPHERICAL PARTICLES

[75] Inventor: Thomas A. Cerbo, Carlstadt, N.J.

[73] Assignee: Potters Industries, Inc., Carlstadt, N.J.

[22] Filed: Mar. 11, 1974

[21] Appl. No.: 450,089

[52] U.S. Cl. .......................... 65/142; 65/21; 264/8; 425/8
[51] Int. Cl............................................ C03b 19/10
[58] Field of Search .......... 65/21, 142; 425/8; 264/8

[56] References Cited
UNITED STATES PATENTS

| | | | |
|---|---|---|---|
| 2,358,068 | 9/1944 | Hiller | 65/21 X |
| 2,616,124 | 11/1952 | Lyle | 65/21 X |
| 3,266,085 | 8/1966 | Nacke | 425/8 |
| 3,560,185 | 2/1971 | Nylander | 65/142 |

Primary Examiner—Robert L. Lindsay, Jr.
Attorney, Agent, or Firm—Curtis, Morris & Safford

[57] ABSTRACT

An apparatus for evenly distributing crushed particles within the draft tube of a bead furnace. The apparatus includes a rotary receptacle in the draft tube which receives the crushed particles from a conveyor and centrifugally projects the particles through a series of capillary orifices in the receptacle. The receptacle forms a cloud of evenly dispersed particles within the draft tube which are directed upwardly into the expansion chamber of the furnace by the heat within the tube to shape the particles by surface tension into spheres.

18 Claims, 4 Drawing Figures

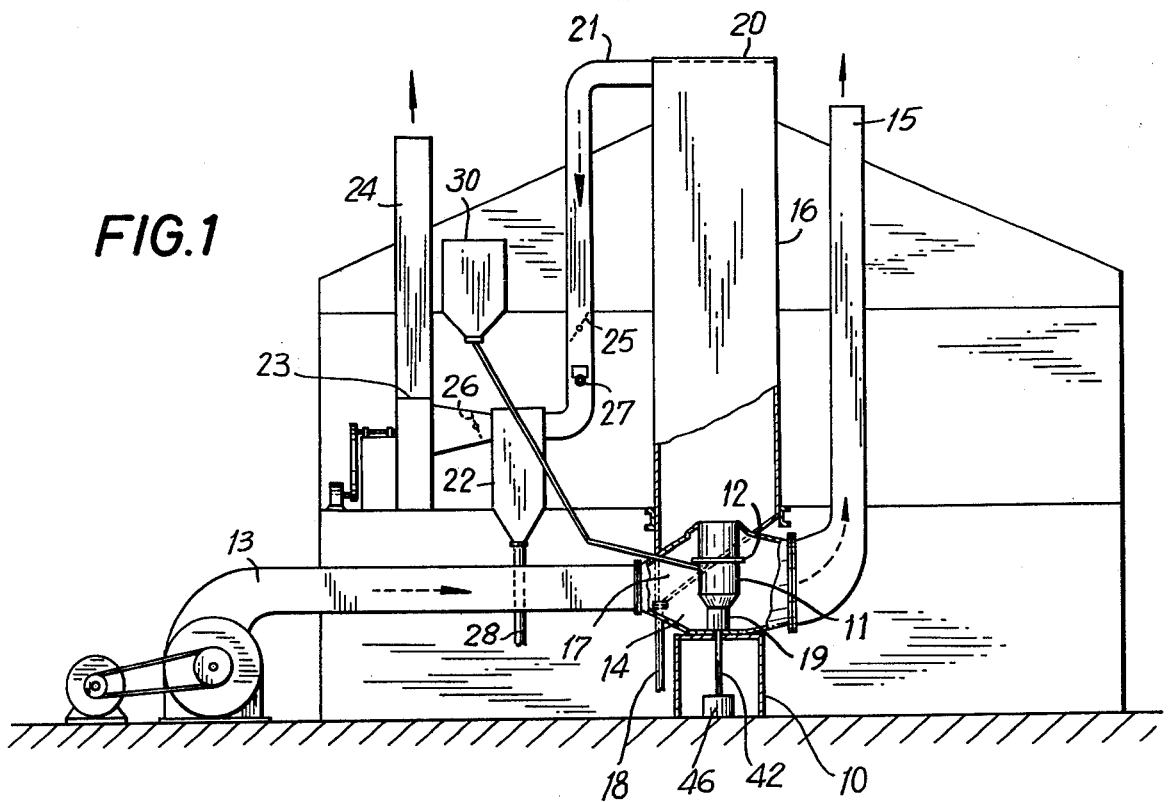

APPARATUS FOR PRODUCING SPHERICAL PARTICLES

BACKGROUND OF THE INVENTION

This invention relates to apparatus for producing spherical particles and more particularly to such apparatus in which the effects of surface tension are utilized to convert a supply of finely divided crushed particles into sperical form.

Spherical particles manufactured in accordance with the invention have a number of industrial and commercial applications. In many cases the spheres are made of glass and are used to provide a reflecting surface, such as in lane marking for highways, for road and advertising signs, motion picture screens, etc. Other uses for the spheres include applications in which their reflecting properties are of little moment, as in situations in which the spheres are employed as fillers for plastic materials, as carriers in xerographic equipment or for various electrical uses. The diameter of the spheres may vary widely and illustratively ranges from 0.125 inch down to 25 microns.

In the manufacture of spheres of the foregoing type, it heretofore has been common practice to introduce irregularly shaped crushed particles into vertically disposed draft tube which is open at its upper end and is provided with a well-distributed gas flame adjacent its lower end. The particles are carried upwardly by the combustion gases into an expansion chamber or stack mounted above the draft tube. During their upward movement, the particles become soft and are shaped by surface tension into a substantially spherical configuration to form beads. For a more detailed discussion of representative sphere manufacturing systems of this type, reference may be had, for example to U.S. Pat. No. 2,619,776 granted Dec. 2, 1952 to Rudolf H. Potters, U.S. Pat. No. 2,945,326 granted July 19, 1960 to Thomas K. Wood and U.S. Pat. Nos. 3,560,186 and 3,560,185 granted Feb. 2, 1971 to Arthur G. Nylander.

The prior apparatus for producing spherical particles have exhibited certain disadvantages. As an illustration, many such prior apparatus proved deficient in the manufacture of spheres from some of the smaller size crushed particles. These deficiencies were of special moment in cases in which the crushed particles were stored for a period of time under comparatively humid conditions prior to their introduction into the draft tube, and the particles tended to agglomerate and were not discharged into the tube with the requisite uniformity. It is important that the particles, irrespective of their size, be evenly introduced into the tube in order to improve the overall uniformity of the product and to provide a sphere producing system of optimum efficiency. In systems of the type employed heretofore difficulties were encountered in achieving these results without unnecessarily complicating the overall construction of the equipment.

SUMMARY

One general object of this invention, therefore, is to provide novel and economical apparatus for producing glass beads or other spherical particles.

More specifically, it is an object of this invention to provide such apparatus in which any tendency of the crushed raw material to agglomerate as it is introduced into the furnace is eliminated.

Another object of this invention is to provide apparatus for producing glass beads wherein the uniformity and precision with which the crushed raw material is introduced into the bead furnace are substantially improved.

Still another object of this invention is to provide new and improved apparatus for manufacturing spherical particles that is economical and thoroughly reliable in operation.

In one illustrative embodiment of the invention, the apparatus includes a vertically disposed draft tube and a series of gas burners for directing heat into the tube. The tube is supplied with finely divided crushed particles by a suitable conveyor which introduces the particles along the axis of the tube in close proximity to the heat from the burners. The heat directs the particles upwardly from the tube into an expansion chamber where they are shaped by surface tension into spherical form.

In accordance with one feature of the invention, a rotary receptacle is disposed within the draft tube for receiving the crushed particles from the conveyor. The receptacle forms a cloud of evenly dispersed particles within the tube, and this cloud proceeds upwardly into the expansion chamber. The resulting spheres exhibit extremely good uniformity with little or no wastage of the raw material.

In accordance with another feature of the invention, in certain particularly important embodiments, the rotary receptacle includes a multiplicity of orifices which extend radially through the receptacle's side wall in a single plane. As the crushed particles pass through these orifices and into the draft tube, any agglomerations of particles are broken up, and the particles are uniformly and evenly distributed within the tube.

In accordance with a further feature of some embodiments of the invention, the receptacle is rotated at a speed sufficient to centrifugally project the crushed particles through the orifices and into the interior of the draft tube without appreciably contacting the inner wall of the tube. The receptacle produces a very gentle dispersion of the particles within the tube to further enhance the overall efficiency of the system.

The present invention, as well as further objects and features thereof, will be more fully understood from the following description of certain preferred embodiments, when read with reference to the accompanying drawings.

BRIEF DESCRIPTION OF THE DRAWINGS

FIG. 1 is a diagrammatic view of apparatus for producing spherical particles in accordance with one illustrative embodiment of the invention.

FIG. 2 is an enlarged fragmentary vertical sectional view of a portion of the apparatus shown in FIG. 1.

DESCRIPTION OF CERTAIN PREFERRED EMBODIMENTS

Figure 3:
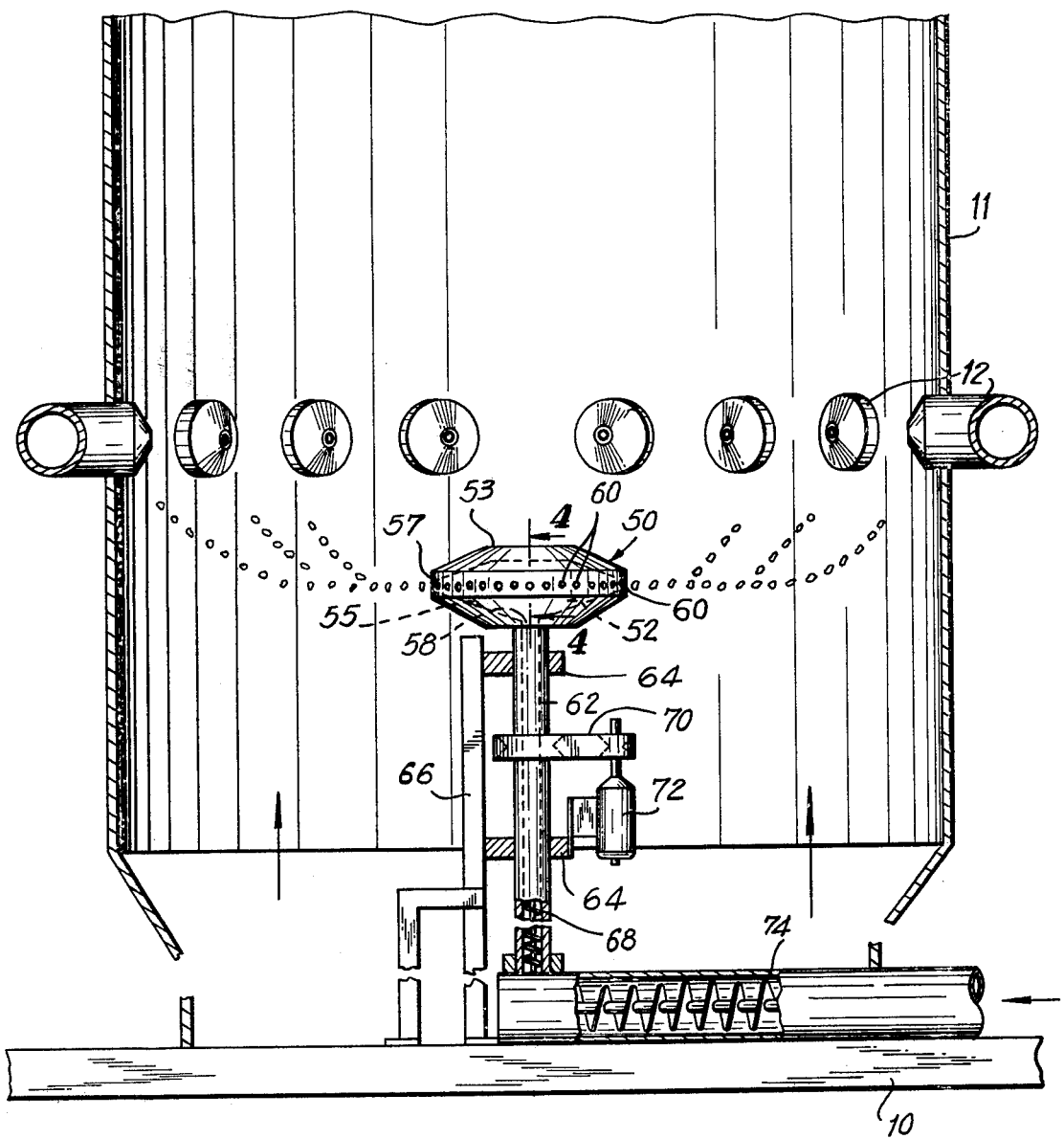
FIG. 3 is an enlarged fragmentary vertical sectional view similar to FIG. 2 but showing apparatus for producing spherical particles in accordance with another illustrative embodiment of the invention.

Referring to FIG. 1 of the drawings, there is shown apparatus for producing spherical particles which includes a controlled suction draft furnace of the type disclosed in Wood U.S. Pat. No. 2,945,326 referred to heretofore. The furnace rests on a suitable support 10 and is provided with an upstanding, generally cylindrical draft tube 11 which is open at its upper end. A series of gas burners 12 project into the tube 11 intermediate its ends. These burners are equally distributed around the tube's periphery to provide a source of heat.

A cooling duct 13 is located adjacent the draft tube 11. The duct 13 is supplied with a stream of air and is connected to a plenum chamber 14 around the tube. The chamber 14 exhausts into a vertical stack 15.

Located coaxially above the open upper end of the draft tube 11 is an enlarged cylindrical expansion chamber 16. The chamber 16 is substantially enclosed and is provided at its lower end with a collection chamber 17. The chamber 17 is disposed around the upper portion of the draft tube 11 and communicates with a discharge conduit 18 leading to a suitable collecting bin (not shown).

The draft within the tube 11 and the expansion chamber 16 is carefully regualted to control the velocity of the combustion gases therein. As more fully described in Wood U.S. Pat. No. 2,945,326 referred to above, a draft regulator 19 is located at the lower end of the tube 11, and the upper end of the chamber 16 is closed by a cover 20. A discharge duct 21 communicates with the chamber 16 adjacent its upper end, and this duct extends downwardly through a separating device 22 to a suction fan 23. The fan 23 exhausts upwardly through a stack 24 to the atmosphere. A pair of dampers 25 and 26 are interposed within the duct 21 on opposite sides of the separating device 22, and the duct includes an adjustable opening 27 to provide an additional draft control. The fan 23 draws air into the tube 11 and the chamber 16 through the draft regulator 19. The combustion gases are exhausted through the duct 21, the separator 22 and the stack 24.

Crushed particles of glass or other vitreous material are continuously fed into the draft tube 11, in a manner that will become more fully apparent hereinafter, and are entrained with the upward flow of hot gases within the tube. During this upward movement, the particles become heated to a temperature sufficient to cause the softening and shaping thereof by surface tension into spherical form. The particles are carried upwardly into the expansion chamber 16, where they cool and solidify in the form of glass spheres. A substantial percentage of the larger spheres falls through the relatively quiescent lateral zones of the chamber 16 to the collection chamber 17. These spheres drop through the discharge conduit 18 and are collected for grading and packing. The finer spheres continue their upward movement with the combustion gases and pass into the duct 21. These latter spheres are separated from the entraining gases in the separating device 22, are discharged through an outfeed conduit 28 and are similarly collected for a grading and packaging.

The structure described thus far is but illustrative of a known combination of sphere producing components. It will be readily apparent that in any such combination care should be taken to insure that the crushed particles are uniformly and evenly distributed within the draft tube 11. The particles should be discharged into the tube in predetermined spatial relationship relative to the burners 12 and to the inner side wall of the tube.

In the illustrated embodiments of the invention, these results are realized as a result of a unique arrangement for distributing the crushed particles within the draft tube 11. Referring to the embodiment of FIGS. 1 and 2, for example, the crushed particles are stored in a hopper shown schematically at 30. These particles may vary widely in size, depending upon the range of sphere sizes to be produced in a given run. In order to realize the maximum benefit from the apparatus, however, the size of the crushed particles within the hopper 30 is comparatively fine and preferably does not exceed about 100 microns.

The crushed particles are introduced from the supply hopper 30 into the draft tube 11 by a conveyor system which comprises a feed conduit 32. The infeed end of the conduit 32 communicates with the hopper 30, and the conduit slopes downwardly from the hopper at an acute angle and enters the tube 11 immediately below the burners 12. As best shown in FIG. 2, the discharge end of the conduit 32 is centrally located within the tube 11 in close juxtaposition with the burners 12 such that the crushed particles are introduced into the tube at a point along the tube's vertical axis.

An open-top rotary receptacle 35 is located in close justaposition with the discharge end of the feed conduit 32. The receptacle 35 is of generally frustroconical configuration and is supported for rotation about the axis of the draft tube 11. The receptacle is fabricated from ceramic or other abrasion resistant material.

The receptacle 35 defines a centrally located cavity 36 which is formed by an inner material-receiving surface 37 and an upstanding cylindrical side wall 39. The surface 37 extends horizontally in a plane perpendicular to the axis of the draft tube 11 and is arranged a short distance beneath the burners 12 in close proximity therewith. The side wall 39 is located around the periphery of the surface 37 and is coaxial with the draft tube.

A multiplicity of capillary orifices 40 extend radially through the side wall 39 in a single horizontal plane. The orifices 40 are equally spaced about the rotational axis of the receptacle 35 and are arrayed in spaced relationship with the material-receiving surface 37. Each of the orifices 40 is of circular cross section and has a diameter which advantageously is slightly less than twice the largest dimension of the crushed particles within the hopper 30. The length of each orifice should be at least equal to and preferably greater than its diameter for best results. In the illustrative embodiment of FIGS. 1 and 2 the receptacle is provided with thirty such orifices which each have a diameter of 1 millimeter.

The receptacle 35 is rotatably supported on the upper end of an upstanding sleeve 42. A drive shaft 44 disposed within the sleeve 42 is affixed at its upper end to the receptacle 35 and at its lower end to a drive mechanism 46. The mechanism 46 is suitably insulated from the heat within the draft tube 11 and includes an electric motor (not visible in the drawings) which rotates the shaft 44 and the receptacle 35 at a constant speed.

In the embodiment of FIGS. 1 and 2 the crushed particles being introduced into the draft tube 11 from the hopper 30 are at substantially room temperature, although in other advantageous arrangements the particles may be preheated in a manner more fully disclosed, for example, in Nylander U.S. Pat. No. 3,560,186 referred to above. The particles pass through the conduit 32 and are discharged into the open top of the receptacle 35 where they drop onto the material-receiving surface 37.

The drive mechanism 46 rotates the receptacle 35 at a uniform constant speed, illustratively 3,500 revolutions per minute, which is sufficient to centrifugally project the crushed particles through the individual orifices 40 and into the interior of the draft tube 11 to form a multiplicity of evenly dispersed particles within the tube. The projected particles do not appreciably contact the inner wall of the tube 11 but instead define an annular cloud having an external diameter of the order of 2 or 3 feet and a circumference which is spaced at least 6 inches from the inner wall of the tube. The centrifugal action of the receptacle 35 creates comparatively gentle forces on each particle as it is discharged into the tube but insures that the discharged particles are highly dispersed and in spaced relationship with one another at the points of discharge. The cloud of particles is precisely located with respect to the burners 12 and exhibits an extremely uniform density. The particles within the cloud are carried in an upward direction by the products of combustion from the burners to form glass spheres in the manner described heretofore. The spheres pass from the expansion chamber 20 along the discharge duct 21 to the separating device 22 and are collected by the outfeed conduit 28 for grading and packaging.

The rotational speed of the receptacle 35 should be sufficiently high to discharge all of the crushed particles from the feed conduit 32 into the draft tube 11. If the speed of the receptacle 35 is too high, on the other hand, the particles may tend to strike the inner wall of the tube 11 and thus impair the overall efficiency of the sphere forming operation. For best results the speed of the receptacle should be maintained within the range of from about 1,000 revolutions per minute to about 5,000 revolutions per minute to provide spheres of optimum quality.

Figure 4:
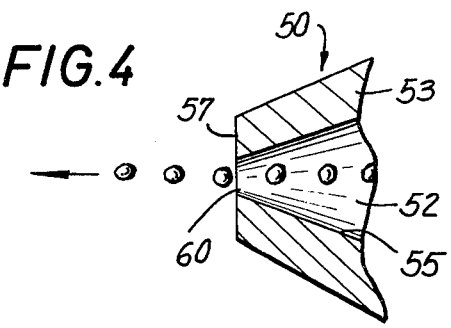
FIG. 4 is a fragmentary sectional view taken along the line 4—4 in FIG. 3.

FIGS. 3 and 4 are illustrative of an alternative receptacle 50 which may be employed in lieu of the receptacle 35 of FIGS. 1 and 2. The receptacle 50 includes a centrally located hollow cavity 52 which is defined by a closed cover 53, a material-receiving surface 55 and an upstanding circular side wall 57. The material-receiving surface 55 is of shallow, frustro-conical configuration and includes an infeed opening 58 which is coaxial with the draft tube. 11. The side wall 57 interconnects the cover 53 and the surface 55 to form the enclosed structure.

A multiplicity of capillary orifices 60 are radially disposed within the upstanding side wall 57. The orifices 60 are arrayed in a manner similar to that described heretofore, but as best illustrated in FIG. 4 the orifices are tapered to provide a gradually decreasing diameter from the axis of the receptacle 50 to its periphery. The diameter of each of the orifices 60 at the periphery of the receptacle 50 is slightly less than twice the maximum dimension of the crushed particles.

The receptacle 50 is affixed to the upper end of a hollow shaft 62 disposed within the chamber formed by the draft tube 11. This shaft is rotatable about the axis of the tube 11 and is journalled in suitable pillow blocks of the tube 11 and is journalled in suitable pillow blocks 64 carried by an upstanding standard 66 on the support 10. An internal helical conveyor 68 is integrally formed within the shaft 62 for rotation therewith, and the upper end of the conveyor communicates with the infeed opening 58 for the receptacle 50. The shaft 62 and the conveyor 68 rotate at a constant speed and are driven by a drive belt 70 and an electric motor 72.

The incoming crushed particles are advanced toward the draft tube 11 by a horizontal screw conveyor 74 of conventional construction. The inner end of the conveyor 74 is located adjacent the axis of the draft tube 11 and communicates with the lower end of the hollow shaft 62. As the shaft 62 rotates in response to the drive motor 72, the particles are carried upwardly into the receptacle 50 by the conveyor 68, and the receptacle is rotated by reason of its connection to the shaft 62. The particles entering the receptacle move along the sloping material-receiving surface 55 and are centrifugally discharged through the capillary orifices 60 into the interior of the draft tube 11 without appreciably contacting the inner wall of the tube. The discharged particles form an evenly dispersed cloud within the tube 11 which is directed upwardly into the expansion chamber 16 by the heat from the burners 12. During their upward movement the particles are shaped by surface tension into glass spheres and are collected in the manner described above.

Although the invention has been described and illustrated as having particular utility in the manufacture of glass spheres, various other particulate materials may be produced thereby without departing from the spirit or scope of the appended claims. As an illustration, irregularly shaped particles of other vitreous materials or of thermoplastic resins, for example, may be shaped into spherical form through the use of the apparatus disclosed herein.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. Apparatus for producing spherical particles comprising, in combination:

heat source means;

means defining a chamber disposed about the heat source means;

supply means containing crushed particles in spaced relationship with the chamber;

means for conveying crushed particles from the supply means to the interior of the chamber;

a rotary receptacle disposed within the chamber for receiving crushed particles from the conveying means, the receptacle including an inner particle-receiving cavity and a multiplicity of orifices extending radially from the cavity;

means for rotating the receptacle at a speed sufficient to centrifugally project the crushed particles through the orifices in the receptacle and into the interior of the chamber, to form a cloud of evenly dispersed particles within said chamber, the heat within said chamber shaping the particles by surface tension into spheres; and collection means connected to the chamber for receiving the thus produced spheres.

2. Apparatus for producing spherical particles comprising, in combination:

means defining a substantially enclosed chamber;

means for heating the interior of the chamber;

supply means containing finely divided crushed particles in spaced relationship with the chamber;

means for conveying crushed particles from the supply means to the interior of the chamber, the conveying means including an infeed end communicating with the supply means and a discharge end disposed within the chamber;

a rotary receptacle disposed within the chamber for receiving crushed particles from the conveying means, the receptacle including an inner particle-receiving surface, an upstanding side wall around the particle-receiving surface, and a multiplicity of orifices extending radially through the side wall;

means for rotating the receptacle at a speed sufficient to centrifugally project the crushed particles through the orifices in the side wall and into the interior of the chamber, to form a cloud of evenly dispersed particles within said chamber, the heat within said chamber shaping the particles by surface tension into spheres; and collection means connected to the chamber for receiving the thus produced spheres.

3. Apparatus as defined in claim 2, in which the rotary receptacle defines an open-top cavity, and the conveying means includes a conduit having an infeed end communicating with the supply means and a discharge end disposed above the cavity in position to feed the crushed particles thereto.

4. Apparatus as defined in claim 2, in which the conveying means comprises a screw conveyor at least partially disposed within the chamber for feeding the crushed particles to the rotary receptacle.

5. Apparatus for producing spherical particles comprising, in combination:

a draft tube;

heat source means for directing heat into the draft tube;

supply means containing crushed particles in spaced relationship with the draft tube;

means for conveying crushed particles from the supply means to the interior of the draft tube;

a rotary receptacle disposed within the draft tube for receiving crushed particles from the conveying means, the receptacle including a particle-receiving surface and multiplicity of radially disposed openings;

means for rotating the receptacle at a speed sufficient to centrifugally project the crushed particles through the openings in the receptacle and into the interior of the draft tube, to form a cloud of evenly dispersed particles within said tube, the heat from the heat source means shaping the particles by surface tension into spheres; and collection means communicating with the draft tube for receiving the thus produced spheres.

6. Apparatus for producing spherical particles comprising in combination:

a vertical draft tube having an inner wall;

heat source means for directing heat into the draft tube;

supply means containing finely divided crushed particles in spaced relationship with the draft tube;

means for conveying crushed particles from the supply means to the interior of the draft tube;

a rotary receptacle disposed within the draft tube for receiving crushed particles from the conveying means, the receptacle including an inner particle-receiving surface, an upstanding side wall around the particle-receiving surface, and a multiplicity of orifices extending radially through the side wall;

means for rotating the receptacle at a speed sufficient to centrifugally project the crushed particles through the orifices in the side wall and into the interior of the draft tube without appreciably contacting the inner wall of the tube, to form a cloud of evenly dispersed particles within said tube, the heat from the heat source means shaping the particles by surface tension into spheres; and collection means communicating with the draft tube for receiving the thus produced spheres.

7. Apparatus for producing spherical particles comprising, in combination:

a vertical draft tube;

heat source means for directing heat into the draft tube;

means including an expansion chamber communicating with and extending above the draft tube;

supply means containing crushed particles in spaced relationship with the draft tube;

means for conveying crushed particles from the supply means to the interior of the draft tube;

rotary means disposed within the draft tube for receiving crushed particles from the conveying means;

means for continuously rotating the rotary means at a speed sufficient to form a cloud of evenly dispersed particles within said tube, the cloud of particles being directed upwardly into the expansion chamber by the heat within said tube to shape the particles by surface tension into spheres; and collection means connected to the expansion chamber for receiving the thus produced spheres.

8. Apparatus as defined in claim 7, in which the conveying means comprises a helical screw conveyor in coaxial relationship with the axis of rotation of the rotary means.

9. Apparatus as defined in claim 8, in which the screw conveyor is rigidly affixed to the rotary means for rotation therewith.

10. Apparatus for producing glass spheres comprising, in combination:

a vertical draft tube;

heat source means for directing heat into the draft tube;

means including an expansion chamber communicating with and extending above the draft tube;

supply means containing finely divided glass particles in spaced relationship with the draft tube;

means for conveying glass particles from the supply means to the interior of the draft tube;

rotary means disposed within the draft tube for receiving glass particles from the conveying means;

means for continuously rotating the rotary means about a vertical axis at a speed sufficient to centrifugally project the received particles and form a cloud of evenly dispersed particles within said tube, the cloud of particles being directed upwardly into the expansion chamber by the heat within said tube to shape the particles by surface tension into glass spheres; and collection means connected to the expansion chamber for receiving the thus produced spheres.

11. Apparatus for producing glass spheres comprising, in combination:

a vertical draft tube;
heat source means for directing heat into the draft tube;
means including an expansion chamber communicating with and extending above the draft tube;
supply means containing finely divided crushed glass particles in spaced relationship with the draft tube;
means for conveying glass particles from the supply means to the interior of the draft tube;
a rotary receptacle disposed within the draft tube for receiving crushed particles from the conveying means, the receptacle including an inner particle-receiving surface and a multiplicity of orifices radially disposed with respect to said surface;
means for rotating the receptacle about a vertical axis at a speed sufficient to centrifugally project the received particles through the orifices and into the interior of the draft tube, to form a cloud of evenly dispersed particles within said tube, the cloud of particles being directed upwardly into the expansion chamber by the heat within said tube to shape the particles by surface tension into glass spheres; and collection means connected to the expansion chamber for receiving the thus produced spheres.

12. Apparatus for producing glass spheres comprising, in combination:

a vertical draft tube;

heat source means for directing heat into the draft tube;

means including an expansion chamber communicating with and extending above the draft tube;

supply means containing finely divided crushed glass particles in spaced relationship with the draft tube;

means for conveying glass particles from the supply means to the interior of the draft tube, the conveying means including a conduit having an infeed end communicating with the supply means and a discharge end axially located within the draft tube adjacent the source of the heat;

a rotary receptacle axially disposed within the draft tube for receiving glass particles from the conveying means, the receptacle including an inner particle-receiving surface, an upstanding side wall around the particle-receiving surface, and a multiplicity of orifices extending radially through the side wall;

means for continuously rotating the receptacle at a speed sufficient to centrifugally project the crushed particles through the orifices and into the interior of the draft tube, to form a cloud of evenly dispersed particles within said tube, the cloud of particles being directed upwardly into the expansion chamber by the heat within said tube to shape the particles by surface tension into glass spheres; and collection means connected to the expansion chamber for receiving the thus produced spheres.

13. Apparatus as defined in claim 12, in which the rotary receptacle has an open top in close juxtaposition with the discharge end of the conduit.

14. Apparatus for producing spherical particles comprising, in combination:

a vertical draft tube;

heat source means for directing heat into the draft tube;

means including an expansion chamber communicating with and extending above the draft tube;

supply means containing finely divided crushed particles in spaced relationship with the draft tube;

means for conveying crushed particles from the supply means to the interior of the draft tube, the conveying means including a screw conveyor located within the draft tube;

a rotary receptacle disposed within the draft tube for receiving crushed particles from the conveying means, the receptacle including an inner particle-receiving surface, an upstanding side wall around the particle-receiving surface, and a multiplicity of orifices extending radially through the side wall;

means for continuously rotating the receptacle at a speed sufficient to centrifugally project the crushed particles through the orifices and into the interior of the draft tube, to form a cloud of evenly dispersed particles within said tube, the cloud of particles being directed upwardly into the expansion chamber by the heat within said tube to shape the particles by surface tension into spheres; and collection means connected to the expansion chamber for receiving the thus produced spheres.

15. Apparatus as defined in claim 14, in which the screw conveyor is connected to the receptacle for rotation therewith.

16. Apparatus for producing glass spheres comprising, in combination:

a vertical draft tube having an inner wall;

heat source means for directing heat into the draft tube;

means including an expansion chamber communicating with and extending above the draft tube;

supply means containing finely divided crushed glass particles in spaced relationship with the draft tube;

means for conveying glass particles from the supply means to the interior of the draft tube, the conveying means including an infeed end communicating with the supply means and a discharge end axially located within the draft tube adjacent the source of heat;

a rotary receptacle axially disposed within the draft tube for receiving glass particles from the conveying means, the receptacle including an inner particle-receiving surface, an upstanding side wall around the particle-receiving surface, and a multiplicity of capillary orifices extending radially through the side wall in a single plane;

means for continuously rotating the receptacle at a speed sufficient to centrifugally project the crushed particles through the orifices and into the interior of the draft tube without appreciably contacting the inner wall of the tube, to form a cloud of evenly dispersed particles within said tube, the cloud of particles being directed upwardly into the expansion chamber by the heat within said tube to shape the particles by surface tension into glass spheres; and collection means connected to the expansion chamber for receiving the thus produced spheres.

17. Apparatus as defined in claim 16, in which the rotating means comprises a drive mechanism which drives the receptacle at a speed within the range of from about 1,000 revolutions per minute to about 5,000 revolutions per minute.

18. Apparatus for producing glass spheres comprising, in combination:

a vertical draft tube having an inner wall;

heat source means for directing heat into the draft tube;

means including an expansion chamber communicating with and extending above the draft tube;

supply means containing finely divided crushed glass particles in spaced relationship with the draft tube;

means for conveying glass particles from the supply means to the interior of the draft tube, the conveying means including a conduit having an infeed end communicating with the supply means and a discharge end axially located within the draft tube adjacent the source of heat;

an open-top rotary receptacle axially disposed within the draft tube for receiving glass particles from the conveying means, the receptacle including an inner particle-receiving surface, an upstanding side wall around the particle-receiving surface, and a multiplicity of capillary orifices extending radially through the side wall in a single plane;

means for continuously rotating the receptacle at a constant speed sufficient to centrifugally project the crushed particles through the orifices and into the interior of the draft tube without appreciably contacting the inner wall of the tube, to form a gentle cloud of evenly dispersed particles within said tube, the cloud of particles being directed upwardly into the expansion chamber by the heat within said tube to shape the particles by surface tension into glass spheres; and collection means connected to the expansion chamber for receiving the thus produced spheres.

* * * * *